Dec. 23, 1958
A. W. VANCE
2,865,565
STEP MULTIPLIER
Filed April 20, 1954
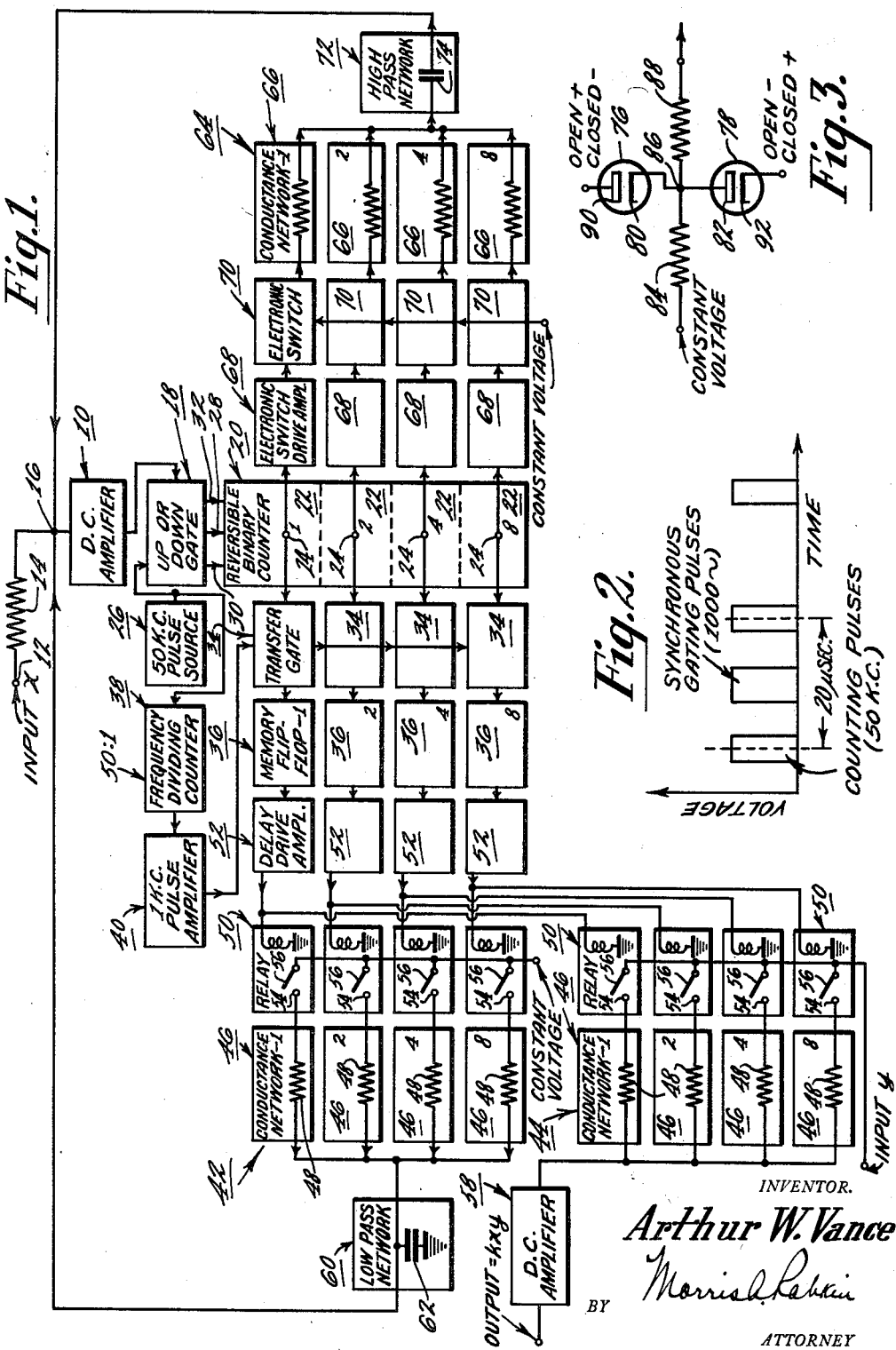
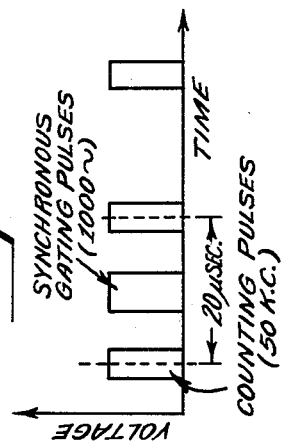
INVENTOR.
Arthur W. Vance
BY Morris␣Larkin
ATTORNEY United States Patent Office 2,865,565
Patented Dec. 23, 1958

2,865,565

STEP MULTIPLIER

Arthur W. Vance, Cranbury, N. J., assignor to Radio Corporation of America, a corporation of Delaware Application April 20, 1954, Serial No. 424,339

12 Claims. (Cl. 235—61)

This invention relates to computers, and particularly to a computer of the type known as a "step multiplier."

This invention relates to a step multiplier of the type described and claimed in my copending application Serial No. 556,195, filed December 29, 1955, as a continuation of my previously copending application Serial No. 90,360, filed April 29, 1949, now abandoned, both entitled "Computing Devices" and assigned to the same assignee as the present invention, and also described in the article by E. A. Goldberg in "Electronics", August 1951, at page 121.

The aforementioned step multiplier is a combination analogue and digital computer. A binary counter is a digital element that is employed in this step multiplier. The counter is reversible, and the counter therein is made proportional to an input variable X. This proportionality is assured by means of a feedback loop including a first relay-operated conductance network, a summing amplifier, and a gate that is responsive to the amplifier output and controls the direction of count by the reversible counter of pulses from an oscillator. The conductances of the first and of a second relay-operated conductance network are made proportional to the count stored in the counter, and, hence, are proportional to the variable X. If a variable voltage Y is applied to the input of the second conductance network, the output current therefrom is proportional to the product XY. The relays respond directly to the count set up in the counter; for each digit change, there is a corresponding conductance adjustment by the relays.

The step multiplier uses fixed resistors and electromechanical relays to connect in circuit various combinations of the resistors. By operating with discrete combinations of accurate components, the accuracy of the multiplier is made extremely high. However, the frequency response of the mutliplier is limited by the speed of operation of the lowest components, which are the relays. Compared to the speed of the rest of the computer, the operating time of the electromechanical relays is large, of the order of $10^{-4}$ seconds; and the aperiodic relay repetition rate is low, of the order of 1000 cycles per second (C. P. S.). Improvement in frequency response of the multiplier may follow advancements in the relay art. However, such advancement is likely to be relatively limited.

Accordingly, it is an object of this invention to provide a new and improved computer of the step multiplier type that is not limited in operating speed by the speed of the relays.

Another object of this invention is to provide a new and improved computer of the step multiplier type that is fast in operation and extremely accurate.

Another object of this invention is to provide a new and improved computer of the step multiplier type that is fast and reliable in operation.

In accordance with this invention, a third conductance network which is operated by electronic switches is employed in addition to the first and second conductance networks operated by electromechanical relays. A constant direct voltage is applied to the inputs of the first and third conductance networks, and the outputs thereof are fed into the input of the summing amplifier together with the variable X. The summing amplifier output is applied to a polarity-sensitive gate, which controls the direction of count of a reversible binary counter. Pulses are applied to the counter through the gate at a repetition frequency much higher than the electromechanical relays can operate. The reversible counter operates the electronic switches at the pulse frequency to complete a high-frequency feedback loop. The count in the counter is transferred through gates to a storage register at a gating frequency much lower than the pulse frequency. The gating frequency is of the same order as the relay operating frequency. The storage register operates the relays of the first and second conductance networks. The first conductance network and the associated relays complete a low-frequency feedback loop. The variable Y is applied to the input of the second conductance network to produce the output product XY. The relays operate at their usual speeds, while the remainder of the multiplier can be operated at the full speed attainable with the electronic components. Adjustment of the reversible counter for low-frequency changes in the variable X is made through the highly accurate feedback loop through the first relay-operated conductance network. Adjustment for high-frequency changes in X is through the fast-action electronic-switch-operated conductance network. Accordingly, the count set up in the counter may be made at high frequencies, with high-frequency changes in X, and the adjustment of the conductance of the second or multiplying network is made at the low gating frequency. As a result, adjustment of the multiplying network is not restricted to a digit-by-digit change in the counter. Large changes in count of the order of a complete counter scale may occur in the counter between gating pulses, and the conductance adjustments in the multiplying network are correspondingly large. Thus, large changes of conductances in the multiplying network are made in much shorter times than if the feedback loop control of the counter is accomplished solely by the electromechanical relays.

The foregoing and other objects, the advantages and novel features of this invention, as well as the invention itself both as to its organization and mode of operation, may be best understood when read together with the accompanying drawing in which like reference numerals refer to like parts and in which:

Figure 1 is a schematic block diagram of an embodiment of this invention.

Figure 2 is an idealized graph of waveforms occurring in the apparatus of Figure 1, and;

Figure 3 is a schematic circuit diagram of an electronic switch that may be employed in the apparatus shown in Figure 1.

Referring to Figure 1, the improved computing device embodying this invention includes a summing amplifier 10 in the form of a direct current (D. C.) amplifier. An input terminal 12, which receives a variable voltage X, is connected through a resistor 14 to the input 16 of the summing amplifier 10. The output of the amplifier 10 is applied to an "up or down" gate 18 which is a polarity-sensitive gate that controls the direction of count in a reversible binary counter 20. The counter 20 is a digital register comprising a plurality of cascaded trigger circuit stages 22. The binary counter stages 22 represent successive powers of the integer two, thus representing 1, 2, 4, 8, etc. in the usual binary fashion. The binary digits one and zero are registered in a counter stage 22 accordingly as the trigger circuit thereof is set and reset, respectively. Different voltage levels are produced at the outputs 24 of the counter stages 22 respectively for these two operating conditions. A pulse generator 26 is connected to the polarity-sensitive gate 18 and, through the gate 18, to the input or "count" or "trigger" lead 28 of the binary counter 20. The polarity-sensitive gate 18 is also connected to separate "add" and "subtract" busses 30, 32 respectively in the counter 20. The output 24 of each stage 22 of the binary counter 20 is connected to a separate transfer gate 34. The output of each transfer gate 34 is connected to a separate flip-flop or bistable trigger circuit 36, of a memory or register. Each flip-flop stage 36 of the memory is associated with a different one of the counter stages 22. The pulse generator 26 is also connected to a frequency-dividing counter 38. The output of the frequency divider 38 is connected to a pulse amplifier 40 which applies gating pulses to the transfer gates 34. First and second conductance networks 42, 44 are provided, each of which has a plurality of stages 46 that are associated with different stages 22 of the binary counter 20. Each stage 46 of the first and second conductance networks 42, 44 is composed of a resistor 48 or combination of resistors that have a conductance value proportional to the power of two represented by the associated counter stage 22. Current flow in each stage 46, of the conductance networks 42, 44 is controlled by a separate relay 50. Relays 50 for first and second network 42, 44 stages 46 of the same order are individually controlled by the single flip-flop 36 associated with that stage. The relays 50 are energized through separate relay-drive amplifiers 52 when the associated flip-flops 36 are set, and the relays 50 are de-energized when the associated flip-flops 36 are reset. The input of the resistor 48 or resistors in each stage 48 of the conductance networks 42, 44 is connected to the fixed contact 54 of the associated relay 50. A constant voltage is applied to the movable contacts 56 of all the relays 50 operating the first conductance network 42. A variable input voltage Y is applied to all of the movable contacts 56 of the relays 50 operating with the second conductance network 44. The outputs of the second network 44 stages 46 are connected to the input of an output amplifier 58. The outputs of the first conductance network 42 stages 46 are connected together and, through a low-pass network 60, to the input 16 of the summing amplifier 10. The low-pass network 60 may include a shunt capacitance 62 connected to the ground.

A third conductance network 64 is provided which has a plurality of stages 66. Each third network stage 66 is associated with a different counter stage 22 and has a conductance proportional to the power of two represented by the associated counter stages 22. The output 24 of each stage 22 of the binary counter 20 is connected to a separate drive amplifier 68. Each amplifier 68 controls a separate electronic switch 70 to which there is applied a constant voltage. The electronic switches 70 control the application of the constant voltage to the inputs of the associated stages 66 of the third network 64. The outputs of the third conductance network stages 66 are connected together and through a high-pass network 72 to the input 16 of the summing amplifier 10. The high-pass network 72 may include a series capacitance 74.

If the output voltage from the summing amplifier 10 exceeds a minimum positive value, the subtract bus 32 in the binary counter 20 is activated, and the polarity-sensitive gate 18 passes pulses from the pulse generator 26 to the "count" lead 28 of the binary counter 20. The counter 20 subtracts one unit for every pulse from the pulse generator 26. If the amplifier 10 output voltage is more negative than a minimum negative value the add bus 30 of the binary counter 20 is activated, and the counter 20 adds one unit for every pulse from the pulse generator 26. If the amplifier 10 output voltage is zero, or any value between the minimum add and subtract voltages, the polarity-sensitive gate 18 does not pass the pulses, and the count in the binary counter 20 is not changed.

The frequency divider 38 produces a train of pulses at a lower frequency than the pulse generator 26. The lower-frequency pulses are amplified and applied to the transfer gates 34 to open these gates 34. The transfer gates 34 apply pulses to the flip-flops 36 to set and reset them to the same operating condition as the associated counter 20 trigger circuits 22. Thereby, the count registered in the counter 20 is periodically transferred to the memory flip-flops 36 at a relatively low frequency. The battery of relays 50 in each conductance network functions as another register with the energized and de-energized states thereof corresponding to the set and reset conditions of the flip-flops 36. The conductance stages 46 in the first conductance network 42 are switched into the circuit by their relays 50 in accordance with the count stored in the memory flip-flops 36 and, therefore, in accordance with the count registered in the binary counter 20. Thus, the total conductance in the first conductance network 42 that is switched into the feedback circuit to the summing amplifier 10 is proportional to the count in the binary counter 20.

The feedback current is also proportional to this count. If the current fed back to the input 16 of the summing amplifier 10 is equal and opposite to the input current proportional to the variable X, the output of the amplifier 10 is zero and the counter 20 remains stationary. The count registered in the counter 20 is then proportional to X. However, if the feedback and the input currents are not equal and opposite, the amplifier 10 output is such that the counter 20 is changed in the proper direction to adjust the conductance of the first network 42 until the feedback current is equal and opposite to the input current. Accordingly, when the feedback current is equal and opposite to the input current, the conductance value that is adjusted in the first conductance network 42 is proportional to the input X. At that time, the conductance value set up in the second conductance network 44 is also proportional to the variable X, because the second network 44 relays 50 are operated synchronously with the first network 42 relays 50 in the same stages by the same flip-flops 36. Accordingly, the output current from the second conductance networks 44 is proportional to the product of the conductance and the applied voltage Y, namely XY. The voltage at the output of the output amplifier 58 is also proportional to the product XY.

If the pulse generator 26 frequency is 50 kilocycles per second (kc.) and the frequency dividing counter 38 provides a step down ratio of 50 to 1, then the count in the binary counter 20 is transferred to the flip-flops 36 at a 1 kc. rate. Accordingly, the relays 50 of the first and second conductance networks 42, 44 operate at a 1 kc. rate, which is a frequency attainable with present-day relays. The electronic switches 70 for the third conductance network 64 operate at the 50 kc. rate of the pulse generator 26 and the binary counter 20 and adjust the conductance value of the third network 64 in the same manner as the relays 50 of the first network 42. Accordingly, the current fed back through the third conductance network 64 is adjusted promptly with any change in the counter 20. The adjustment of the third network 64 conductance is as fast as the counter 20 can count. Any tendency for the binary counter 20 to "overshoot," due to sudden changes in the input X which could not be followed quickly enough by the electro-mechanical relays 50, is prevented by the third conductance network 64 and the electronic switches 70. Due to the electronic switches 70, information can be fed back to the amplifier 10 input 16 as fast as X changes, ensuring that the proper count is set up in the binary counter 20. Since such "overshoot" effect is confined to the higher frequencies, and the accuracy of the electronic switches 70 is low compared to the relays 50, the high-pass network 72 is interposed in the feedback through the third network 64. As a result, the feedback from the third network 64 is confined to the relatively high frequencies, that is to say, of the order of and above the 1 kc. gating frequency. The low-frequency components in the input X are followed by the highly accurate relays 50 in the first conductance network 42. Accordingly, low-frequency changes in the input X are set up in the binary counter 20 with undiminished accuracy. The low pass network 60 in the first network 42 feedback path may be employed where an upper cut-off of the information fed back from the first conductance network 42 is found desirable. The actual multiplying is performed by the second network 44 which uses relays only, since the very high frequencies that the electronic switches 70 would contribute to the product XY are neither necessary for desirable. A wide range of types of response in the product XY resulting from a steep change in X may be achieved by varying the character of the high and low pass networks 60, 72.

The transfer gating pulses applied to the transfer gates 34 are of relatively short duration compared to, and fall in between, the higher frequency pulses from the pulse generator 26. In this way, the counter 20 is in a quiescent state during the interval in which the transfer is taking place to the memory flip-flops 36. This arrangement of pulses is shown in Figure 2. The proper phasing of the gating pulse with respect to the counting pulses may be accomplished by a time-delay circuit (not shown) of any appropriate form at the output of the frequency divider 38.

In the step multiplier described in the aforementioned patent application and article, the pulse and counting rate is substantially the same as the relay speed of 1,000 C. P. S. With a counter having 1,024 counts representing full scale, the counting rate and the limit of the computer speed is about one full scale per second. Thus, for each unit change in the counter, there is a relay operation to adjust the conductance of the multiplying network.

In the step multiplier of Figure 1, however, the rate of change of the count is 50 times faster than the aforementioned prior multiplier. The counter and computer operate at a speed of 50 full counter scales per second, while the relays operate at the attainable speed of 1,000 C. P. S. With extremely short pulses and excellent timing relations, the counting speed can be increased to a megacycle rate (1,000 full scales per second) without requiring an increase in the speed of the individual relays. At such a speed, the feedback path through the electronic switches 70 and the third network 64 ensures a proper count at the rate of a full scale in $$\frac{1}{1000}$$

of a second. In the time between gating pulses, the counter can change a full scale, which would result in the operation of a full battery of the relays 50 for a corresponding adjustment of the multiplying-network conductance. Thus, it is seen, there is provided a system that includes a high-speed, all electronic means for setting up, by means of a counter, a combination of discrete or digital electrical conditions corresponding to a variable input X. In addition, the system includes means for intermittently transferring, by means of the transfer gates and relays, the combination of discrete electrical conditions to vary the multiplying-network conductance to correspond to said combination of electrical conditions and to said input X. The feedback system and counter converts the variable analogue X to a digital form, namely, the count registered in the counter stages. The relays and multiplying network reconvert the digital representation of X to an analogue form, namely, a conductance.

Appropriate forms of the D. C. amplifier, polarity-sensitive gate, reversible binary counter, pulse generator, and relay drive amplifier are described in the aforementioned patent and article. Appropriate forms of frequency dividing counters, gating circuits and pulse amplifiers are well known in the art.

In Figure 3, there is shown a combined electronic switch and conductance network that may be used for example as the switch 70 and network 66 of Figure 1. The electronic switch of Figure 3 includes a first and second diode 76, 78 connected in series with the first diode 76 cathode 80 connected to the second diode 78 anode 82. The constant voltage is applied to one end of a first resistor 84, the other end of which is connected to the junction 86 of the diodes 76, 78. One end of a second resistor 88 is connected to the junction 86 of the diodes 76, 78 and the other end of the second resistor 88 is connected through the high frequency feedback path of Figure 1 to the input 16 of the summing amplifier 10 as described above. The combined conductances of the two resistors 84, 88 of Figure 3 determined the conductance of a stage of the third conductance network 66. The drive amplifier 68 for the switch 70 may be a push-pull amplifier (not shown), the outputs of which are applied to the first diode 76 anode 90 and the second diode 78 cathode 92.

When the binary digit one is registered in the associated counter stage 22, the electronic switch 70 is closed so that current flows through the third conductance network stage 66. In this case, a large positive voltage is applied to the second diode cathode 92 and an equal amplitude negative voltage is applied to the first diode anode 90, the positive and negative voltages thus being in push pull. As a result of these large switching voltages the diodes 76, 78 present a high shunt impedance to the current through the resistors 84, 88, and this current through the resistors (which is the feedback current) is, therefore, unaffected by the diodes 76, 78. Therefore, the switch 70 is closed.

If a zero is set up in the associated stage 22 of the binary counter 20 the electronic switch 70 is open so that no current is fed back to the amplifier 10 through that stage 66 of the third network 64. In this case, a small (near ground) negative voltage is applied to the second diode cathode 92 and an aqual amplitude positive voltage is applied to the first diode anode 90. The diodes 76, 78 conduct and provide a low impedance path to currents through resistor 84 from the constant voltage source. The push-pull voltage amplitudes are such that the junction of the diodes 86 is held at substantially ground potential. Consequently, there is no current fed back through the second resistor 88 to the summing amplifier 10, and the switch may be considered open.

It is apparent, therefore, from the above description of this invention, that a new and improved computer of the step multiplier type is provided. This computer is fast in operation and extremely accurate and reliable. The computer may operate at speeds appropriate to its electronic components, and computer speed is not limited to the speed of the electromechanical relays.

What is claimed is:

1. In a computer, wherein a varying electrical signal represents a variable, means including first register means having a plurality of stages for converting at a certain characteristic frequency said electrical signal to a combination of discrete electrical conditions of said register stages, second register means having a plurality of stages each associated with a different one of said first register stages, means for transferring at another lower frequency said first register electrical conditions to associated stages of said second register means, a variable conductance network, switching means responsive to the electrical conditions of said second register means for varying the conductance of said network, and means for applying another electrical signal to said conductance network.

2. In a computer wherein a varying electrical signal represents a variable, means for converting at a predetermined characteristic frequency said electrical signal to a combination of discrete electrical conditions digitally representing said variable, a variable conductance network, means responsive to said electrical conditions and operating periodically at a predetermined lower frequency for varying said conductance network in accordance with said combination, and means for applying an electrical signal to said conductance network.

3. In a computer wherein a varying electrical signal represents a variable, means including register means having a plurality of stages for converting at a predetermined characteristic frequency said electrical signal to a combination of discrete electrical conditions of said register stages digitally representing said variable, a variable conductance network, switching means responsive to the electrical conditions of said register means for varying the conductance of said network in accordance with said combination, means periodically operable at a predetermined lower frequency for intermittently coupling said switching means to said register means, and means for applying an electrical signal to said conductance network.

4. The combination as recited in claim 3 wherein said signal converting means includes means operating at a frequency greater than said predetermined frequency for changing said electrical conditions of said register means.

5. The combination as recited in claim 3 wherein said register means includes a pulse counter, and said means for changing said electrical conditions of said register means includes a pulse generator.

6. In a computer, the combination of an amplifier, means for supplying to the input of said amplifier a first input signal, reversible pulse counter means responsive to the output of said amplifier for adding and subtracting pulses, means for applying pulses at a predetermined frequency to said counter means, a plurality of variable impedance networks, means coupled to said counter means for varying the impedances of one of said networks in accordance with the count established in said counter means and at a second frequency lower than said pulse frequency, additional means coupled to said counter means for varying the impedance of another of said networks in accordance with the count established in said counter means and at said pulse frequency, means for applying a second input signal to said one and another impedance networks, and separate means coupling said impedance networks to the input of said amplifier.

7. The combination of an amplifier, means for supplying to the input of said amplifier an electrical signal proportional to the value of a variable, a reversible pulse counter, means for transmitting pulses having a predetermined frequency to said counter, means coupling said counter to said amplifier for controlling the direction of count of said counter in accordance with the polarity of the output of said amplifier, a plurality of adjustable impedance means, means for applying a fixed signal to a first and third of said impedance means, means coupled to said counter for adjusting said third impedance means at the frequency of said transmitted pulses responsive to the count of said counter, additional means coupled to said counter for adjusting said first and a second of said impedance means at a second frequency lower than the frequency of said transmitted pulses responsive to the count of said counter, and separate means coupling said first and third impedance means to the input of said amplifier.

8. In a device for multiplying a multiplicand by a multiplier, the combination of a summing amplifier, means for supplying to the input of said amplifier electrical signals representative of said multiplier, reversible pulse counter means responsive to the output of said amplifier for respectively adding and subtracting pulses accordingly as the output of said amplifier is one and the other of opposite polarities, means for transmitting pulses having a predetermined frequency to said counter means, a plurality of variable impedance networks, means coupled to said counter means for varying the impedances of a first and a second of said networks in accordance with the count established in said counter means and at a second frequency lower than said pulse frequency, means coupled to said counter means for varying the impedance of a third of said networks in accordance with the count established in said counter means and at said pulse frequency, means for applying a fixed input signal to said first and third impedance networks, first and second means respectively coupling the outputs of said first and third conductance networks to the input of said amplifier, said second coupling means passing signals of frequency substantially the same as said pulse frequency, and means for applying to the input of said second network electrical signals representative of said multiplicand.

9. In a device for mutliplying a multiplicand by a multiplier, the combination of a summing amplifier, means for supplying to the input of said amplifier electrical signals representative of said multiplier, reversible pulse counter means responsive to the output of said amplifier for respectively adding and subtracting pulses accordingly as the output of said amplifier is one and the other of opposite polarities, means for transmitting pulses having a predetermined frequency to said counter means, a plurality of variable impedance networks, means coupled to said counter means for varying the impedances of a first and second of said networks in accordance with the count established in said counter means and at a second frequency lower than said pulse frequency, means coupled to said counter means for varying the impedance of a third of said networks in accordance with the count established in said counter means and at said pulse frequency, means for applying a fixed input signal to said first and third conductance networks, first and second means respectively coupling the outputs of said first and third impedance networks to the input of said amplifier, said second coupling means including means for blocking signals of frequency lower than said second frequency, any amplifying means responsive to the output of said second network for producing signals representative of the product of the multiplicand and multiplier.

10. In a device for multiplying a multiplicand by a multiplier, the combination of a summing amplifier, means for supplying to the input of said amplifier electrical signals representative of said multiplier, means including a gate responsive to the output of said amplifier for transmitting pulses having a predetermined frequency only when the output of said amplifier exceeds a predetermined minimum, a reversible counter responsive to said amplifier output for respectively adding and subtracting said transmitted pulses accordingly as said amplifier output is one and the other of opposite polarities, a plurality of variable conductance networks, means coupled to said counter for varying the conductances of a first and second of said networks in accordance with the count established in said counter and at a second frequency lower than said pulse frequency, means coupled to said counter for varying the conductance of a third of said networks in accordance with the count established in said counter and at said pulse frequency, means for applying a fixed input voltage to said first and third conductance networks, first and second means respectively coupling said first and third conductance networks to the input of said amplifier, said second coupling means passing signals of frequency substantially the same as said pulse frequency, and means for applying to said second network electrical signals representative of said multiplicand.

11. In a device for multiplying a multiplicand by a multiplier, the combination of a summing amplifier, means for supplying to the input of said amplifier electrical currents representative of said multiplier, means including a gate responsive to the output of said amplifier for transmitting pulses having a predetermined frequency, a reversible counter responsive to said amplifier output for respectively adding and subtracting said transmitted pulses accordingly as said amplifier output is one and the other of opposite polarities, three variable conductance networks, means coupled to said counter for varying the conductances of a first and second of said networks in accordance with the count established in said counter, means for actuating said conductance varying means at a second frequency less than said pulse frequency, means coupled to said counter for varying the conductances of a third of said networks in accordance with the count established in said counter and at said pulse frequency, means for applying a fixed input voltage to said first and third conductance networks, first and second means respectively coupling said first and third conductance networks to the input of said amplifier, said second coupling means including means for blocking signals of frequency lower than said second frequency, means for applying to said second network electrical voltages representative of said multiplicand, and amplifying means responsive to the outputs of said second network for producing voltages representative of the product of the multiplicand and multiplier.

12. In a device for multiplying a multiplicand by a multiplier, the combination of a summing amplifier, means for supplying to the input of said amplifier electrical currents representative of said multiplier, means including a gate responsive to the output of said amplifier for transmitting pulses having a predetermined frequency, a reversible binary counter having a plurality of stages and responsive to said amplifier output for respectively adding and subtracting said transmitted pulses accordingly as said amplifier output is one and the other of opposite polarities, three variable conductance networks, each of said networks including a plurality of resistors having values by which the conductance of the network may be adjusted by amounts proportional to different powers of two, a plurality of relays responsive to one condition of different stages of said counter for connecting in the associated networks different ones of the resistors of first and second ones of said networks, gate means for transmitting the electrical conditions of said counter stages to said relays, means for applying to said gate means gating pulses having a frequency less than said predetermined pulse frequency, a plurality of electronic switches responsive to said one condition of different counter stages for connecting in the associated network different ones of the resistors of a third one of said networks, means for transmitting at said predetermined pulse frequency the electrical conditions of said counter stages to said electronic switches, means for applying a fixed input voltage to said first and third networks, first and second means respectively coupling said first and third conductance networks to the input of said amplifier, said second coupling means including means for blocking signals of frequency lower than said gating frequency, means for applying to said second network electrical voltages representative of said multiplicand, and amplifying means responsive to the outputs of said second network for producing voltages representative of the product of the multiplicand and multiplier.

References Cited in the file of this patent

UNITED STATES PATENTS 2,539,623    Heising _____ Jan. 20, 1951

OTHER REFERENCES

Goldberg, "Step Multiplier in Guided Missile Computer," Electronics, August 1951; vol. 24, No. 8, pages 120–124.

Electronic Analog Computers (Korn and Korn), published by McGraw-Hill Book Co., New York, 1952, pages 226–228.